(12) United States Patent
Tomlinson et al.

(10) Patent No.: US 12,468,633 B2
(45) Date of Patent: *Nov. 11, 2025

(54) HOLD-ASIDE BUFFER FOR UNCOMMITTED WRITE TRANSACTIONS IN A LOG STRUCTURED KEY-VALUE DATABASE

(71) Applicant: MICRON TECHNOLOGY, INC., Boise, ID (US)

(72) Inventors: Alexander Tomlinson, Austin, TX (US); Gaurav Sanjay Ramdasi, Pune (IN); Gregory Alan Becker, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/968,771

(22) Filed: Dec. 4, 2024

(65) Prior Publication Data

US 2025/0094351 A1 Mar. 20, 2025

Related U.S. Application Data

(63) Continuation of application No. 18/209,850, filed on Jun. 14, 2023, now Pat. No. 12,197,339.

(30) Foreign Application Priority Data

Jun. 14, 2022 (IN) .............................. 202241033907

(51) Int. Cl.
*G06F 12/08* (2016.01)
*G06F 12/0875* (2016.01)

(52) U.S. Cl.
CPC .. *G06F 12/0875* (2013.01); *G06F 2212/1016* (2013.01); *G06F 2212/163* (2013.01)

(58) Field of Classification Search
None
See application file for complete search history.

(56) References Cited

U.S. PATENT DOCUMENTS

| | | | |
|---|---|---|---|
| 11,392,562 B2* | 7/2022 | Fan | G06F 16/2379 |
| 11,449,430 B2* | 9/2022 | Park | G06F 16/24569 |
| 11,762,846 B1* | 9/2023 | Atherton | G06F 16/27 |
| | | | 713/193 |
| 2016/0085772 A1* | 3/2016 | Vermeulen | G06F 16/21 |
| | | | 707/615 |
| 2016/0086260 A1* | 3/2016 | Vermeulen | G06Q 40/00 |
| | | | 705/35 |
| 2016/0110403 A1* | 4/2016 | Lomet | G06F 16/2255 |
| | | | 707/695 |
| 2018/0218022 A1* | 8/2018 | Mace | G06F 16/28 |
| 2020/0226035 A1* | 7/2020 | Li | G06F 11/1446 |

(Continued)

*Primary Examiner* — Eliyah S. Harper
(74) *Attorney, Agent, or Firm* — Lowenstein Sandler LLP

(57) ABSTRACT

An event trigger to flush key-value data from a volatile memory device is detected. In response to detection of the event trigger, a determination is made whether the key-value data comprises uncommitted data for one or more active database transactions. If the key-value data comprises uncommitted data for one or more active database transactions, the uncommitted data is moved to a hold aside buffer in the volatile memory device, and committed data in the key-value data is stored on a non-volatile memory device.

20 Claims, 6 Drawing Sheets

(56) References Cited

U.S. PATENT DOCUMENTS

| | | | | |
|---|---|---|---|---|
| 2022/0129445 | A1* | 4/2022 | Helland | G06F 16/27 |
| 2022/0382651 | A1* | 12/2022 | Lu | G06F 11/1471 |
| 2023/0244649 | A1* | 8/2023 | Helland | G06F 16/2255 |
| | | | | 707/741 |
| 2023/0385265 | A1* | 11/2023 | Karamanolis | G06F 16/2471 |
| 2023/0401155 | A1* | 12/2023 | Tomlinson | G06F 12/0246 |
| 2023/0409545 | A1* | 12/2023 | Gupta | G06F 16/211 |
| 2024/0126744 | A1* | 4/2024 | Gupta | G06F 16/2379 |
| 2024/0248879 | A1* | 7/2024 | Dimitriev | G06F 16/185 |
| 2024/0248905 | A1* | 7/2024 | Dimitriev | G06F 16/254 |

* cited by examiner

HOLD-ASIDE BUFFER FOR UNCOMMITTED WRITE TRANSACTIONS IN A LOG STRUCTURED KEY-VALUE DATABASE

CROSS REFERENCE TO RELATED APPLICATIONS

This application is a continuation of U.S. patent application Ser. No. 18/209,850, filed Jun. 14, 2023, which claims the benefit of priority under 35 U.S.C. § 119 to Indian Patent Application number 202241033907, filed Jun. 14, 2022, each of which are hereby incorporated by reference herein in their entirety.

TECHNICAL FIELD

Embodiments of the disclosure generally relate to memory sub-systems, and more specifically, to the use of a hold-aside buffer to facilitate transactions in a log structured key-value database stored across one or more memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
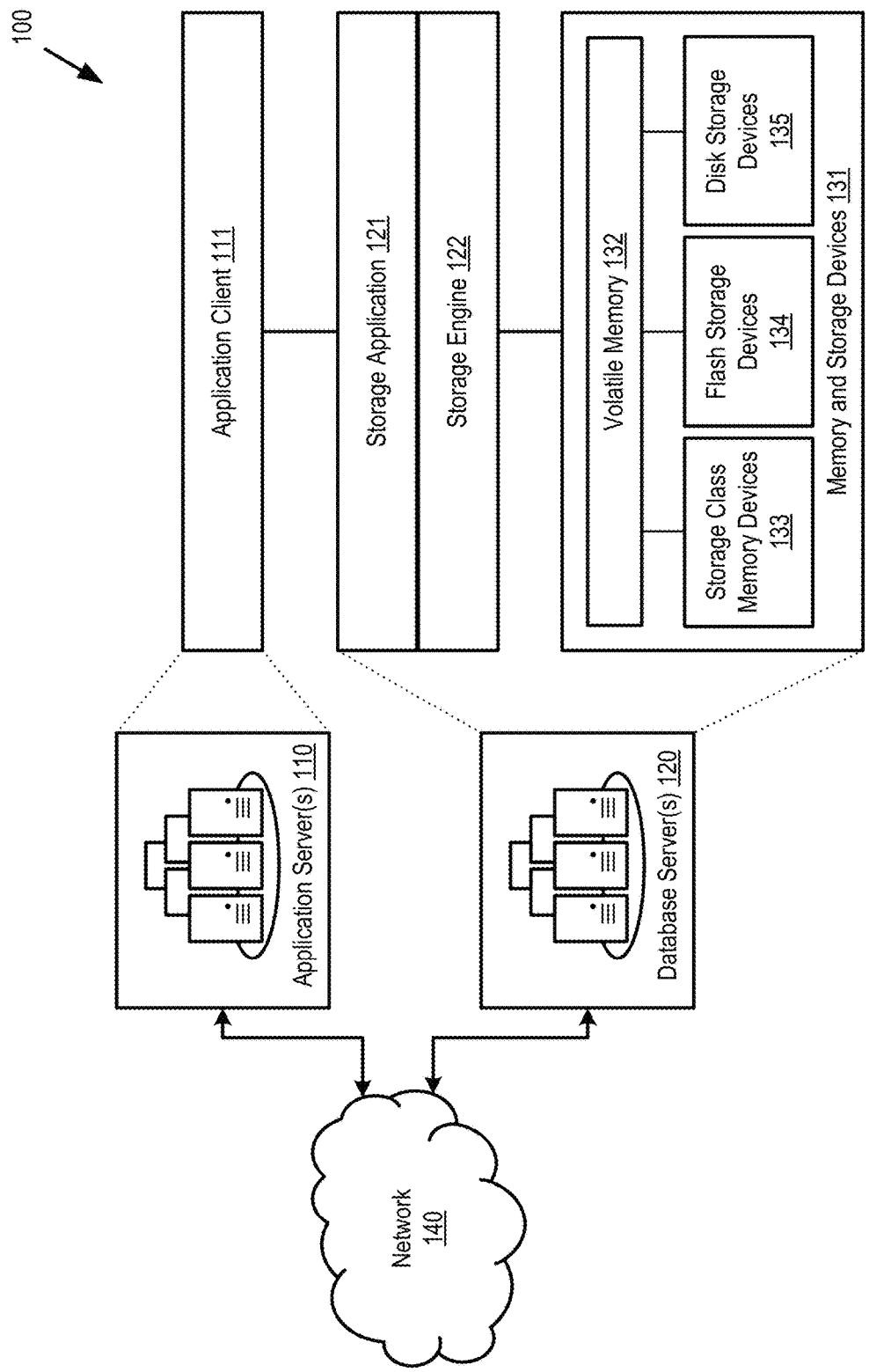
FIG. 1 illustrates a high-level system architecture in accordance with some embodiments of the present disclosure.

Aspects of the present disclosure are directed to the use of a hold-aside buffer to facilitate transactions in a log structured key-value database stored across one or more memory sub-systems. A memory sub-system can be a storage device, a memory module, or a combination of a storage device and memory module. Examples of storage devices and memory modules are described below in conjunction with FIG. 2. In general, a host system can utilize a memory sub-system that includes one or more components, such as memory devices that store data. The host system can provide data to be stored at the memory sub-system and can request data to be retrieved from the memory sub-system.

In computing, a database is an organized collection of information stored and accessed electronically. Small databases can be stored on a file system, while large databases may be hosted on computer clusters and/or cloud storage. A database management system is a software system that helps to define, create, maintain, and control access to the database. The database management system interacts with end users, applications, and the database itself, and typically consists of multiple components, each responsible for handling different aspects of a database operation. One such component is the storage engine which may serve as an interface for reading data from, and writing data to, one or more memory and storage devices on which the database may reside.

The storage engine can utilize a number of different data structures to store a database. One such data structure is the log-structured merge tree (or LSM tree). In an LSM tree, data is stored in the form of key-value pairs that are written one after another, as in a log file (hence the term "log-structured"). LSM trees, by design, are limited to append operations such that any modification, whether a write, update, or delete, is implemented by appending data to the end of the "log." For example, data is deleted by appending a key-value pair with a special marker indicating deletion of the associated key. Similarly, updating data is implemented by appending a key-value pair with the new value that is to be associated with the key. The older key-value pair is not immediately removed from the tree, and a request for the value associated with a particular key may simply return the most recently added key-value pair.

LSM trees typically maintain data in a hierarchy of storage levels, with level 0 residing in volatile memory and levels 1 to N residing on non-volatile memory. As part of a "flush" operation (or "ingest" operation), data in level 0 is written to level 1 as an immutable "storage object" (i.e., that cannot be modified). As the higher storage levels (i.e., levels 1 to N) "fill up", the storage objects are "merged" to create new storage objects, which may be placed into the next higher numbered storage level, and the underlying storage objects are deleted. LSM tree databases frequently hold the invariant that data in lower levels is newer than data in higher levels, which allows for more efficient searching as a query may terminate as soon as a match is found.

Databases frequently support the use of transactions. A database transaction is a single "unit" of logic or work, sometimes made up of multiple operations. A transaction, for example, might consist of one or more data-manipulation statements and queries, each reading and/or writing information in the database. The database management system may look to ensure two key properties for a database transaction: atomicity and isolation. Atomicity guarantees that each transaction is treated as a single "unit", which either succeeds completely or fails completely: if any of the statements or queries constituting a transaction fails, the entire transaction fails and the database is left unchanged. A guarantee of atomicity prevents updates to the database from occurring only partially, which can cause greater problems than rejecting the whole series outright. For example, in an application that transfers funds from one account to another, the atomicity property ensures that, if a debit is made successfully from one account, the corresponding credit is made to the other account. Isolation requires the intermediate state of a transaction to be invisible to other transactions. For example, in the funds transfer application, the isolation property ensures that another transaction sees the funds in one account or the other, but not in both, nor in neither.

In order to assure atomicity and isolation, changes made to data in the course of a transaction are initially placed in an uncommitted state. If the transaction is successful, the database management system commits the changes made to the data; that is, it makes them persistent and visible to other transactions. If a transaction fails (i.e., if the transaction is aborted), changes made to the data are never committed and remain in the uncommitted state, and are eventually purged from the system (e.g., as part of a garbage collection operation).

Complications, however, arise in LSM tree databases when a flush operation is initiated while a transaction is ongoing and uncommitted data is present in level 0, which is frequently the case with large or long-lived transactions. The uncommitted data cannot be written to level 1 without causing a host of problems. First, it would violate the invariant that data in lower levels is newer than data in higher levels. That is, the instant a transaction commits its data becomes the newest data in the system. But if uncommitted data for a transaction is flushed to level 1 (i.e., while the transaction is ongoing) and the transaction later commits, the newest version of the data would reside in level 1; however, an older version of the data could reside in level 0 (e.g., if another transaction, initiated after the flush operation but committed before the initial transaction commits, changed the data). Second, any uncommitted data written to level 1 would need to be committed (i.e., made visible) once the transaction commits. But because the storage object containing the uncommitted data in level 1 is immutable, this is practically infeasible. This issue is particularly problematic in the case of long-lived transactions, which could have uncommitted data written in multiple storage objects across multiple storage levels.

Existing LSM tree-based database management systems avoid the problem by deferring the flush operation until all transactions with uncommitted data in level 0 have either committed or aborted. But doing so has serious drawbacks in that it requires the database management system to either allow level 0 to grow boundlessly, consuming (and potentially exhausting) precious system memory, or limit the size and duration of transactions, limiting the practical utility of the database.

Aspects of the present disclosure address the above and other deficiencies by using a hold-aside buffer, which may reside in volatile memory (e.g., as a dynamically allocated data structure), to facilitate database transactions. During a flush operation, uncommitted data from any ongoing transactions in level 0 can be written to the hold-aside buffer, allowing the remaining committed data to be written to level 1. The uncommitted data remains in the hold-aside buffer until its transaction commits at which point the data can be committed and safely flushed to level 1. Because the data from the hold-aside buffer is only flushed to level 1 after the transaction commits, the invariant that data in level 0 be newer than data in level 1 holds. And, because the hold-aside buffer is not stored as an immutable object, the data can be committed without much difficulty.

Advantages of the present disclosure include, but are not limited to, enabling database transactions, particularly large and/or long-lived transactions, to be effectively and efficiently performed on an LSM tree database. That is, by using the hold-aside buffer of the present disclosure, data in level 0 can be flushed to level 1 even when uncommitted data from an ongoing transaction is present. As a result, system resources, specifically system memory, are more efficiently utilized, as the database management system need not let level 0 grow boundlessly while it waits for a transaction to commit or abort. It also eliminates the need to limit the size or duration of transactions that can be performed, and thus serves to improve the database management system's capabilities and performance.

FIG. 1 illustrates a high-level system architecture in accordance with some embodiments of the present disclosure. System 100 may include an application client 111, a storage application 121, a storage engine 122, and memory and storage devices 131. The application client 111 may serve as the primary interface between a user and storage application 121. The application client 111, for example, may be an enterprise application, an e-commerce website, or other data-centric application that may store and/or access information from one or more data sources (e.g., databases, object stores, or the like) through storage application 121.

The storage application 121 may be responsible for managing one or more data sources used by the application client 111, and may provide an interface (e.g., an application programming interface) through which the application client 111 may access the data sources. The storage application 121, for example, may take the form of a database management system that can be used to define, create, and maintain one or more databases. The database management system may allow the application client 111 to access and modify data in the databases (e.g., allowing the application client 111 to store, read, update, and/or delete data in the database). The database management system may also support the use of database transactions, allowing the application client 110 to execute a set of data manipulations and/or queries as a single transaction.

The database management system may rely upon a number of different components to facilitate database operation including storage engine 122. The storage engine 122 may interface with one or more memory and storage devices 131 to provide the underlying storage functionality required by storage application 121. The storage engine 122, for example, may serve as an interface for reading data from, and writing data to, a database that may physically reside on one or more memory and storage devices 131. The storage engine 122, for example, may be configured to maintain a database as an LSM tree (i.e., an LSM tree database), with its data organized in a hierarchy of storage levels (i.e., Levels 0 to N) written across volatile memory 132 (e.g., DRAM), storage class memory devices 133 (e.g., NVDIMM), flash storage devices 134 (e.g., SSDs), and/or disk storage devices 135 (e.g., HDDs).

In the case of LSM tree databases, the storage engine 122 may support two elemental data operations: store (or put) and read (or get). The store operation may be used to add data (i.e., in the form of a key-value pair) to the database, which the storage engine 122 may write to Level 0 of the LSM tree. The read operation may be used to retrieve data from the database. The storage engine 122, for example, may search the LSM tree and return the value (or set of values) associated with a particular key (or a "not found" status, where no such key exists). In some embodiments, the read operation may return the value of the most recently added key-value pair. Where the LSM tree database may uphold the invariant that data in higher levels be older than data in lower levels (e.g., data in Level 0 is newer than data in Levels 1 to N), the search may proceed from top to bottom (i.e., Level 0 to Level N) and terminate as soon as a key-value pair is found, as this would be the most recent key-value pair added to the database.

As noted above, the database management system may support additional database operations, such as update or delete. In the case of LSM tree databases, the storage engine 122 may recast these operations as store operations. The storage engine 122, for example, may perform an update by adding a key-value pair to the database with the new value to be associated with the key. Likewise, for a delete operation, the storage engine 122 may add a key-value pair with a special value indicating deletion for the key (often referred to as a "TOMBSTONE" value).

The storage engine 122 may be configured to perform additional operations for maintaining the LSM tree database. The storage engine 122, for example, may be configured to perform a "flush" (or "ingest") operation, whereby data in Level 0 is written to Level 1. The storage engine 122 may perform the "flush" operation periodically (e.g., every 50 ms), upon request from the storage application 121, or once Level 0 "fills up" (e.g., exceeds a particular size). The data may be written to Level 1 as an immutable "storage object" (i.e., that cannot be modified). The storage engine 122, likewise, may be configured to perform a "compaction" operation, whereby storage objects in levels 1 and higher of the LSM tree may be "merged" together to form new storage objects. The merge operation may return the union of key-value pairs sorted by key, and may eliminate duplicate and deleted data (i.e., perform garbage collection). The new storage objects may be placed in the same or next higher storage level, and the original storage objects are deleted. The storage engine 122 may employ different compaction policies, for example, to constrain the shape of the LSM tree, to determine what storage objects are to be merged, and/or to define the conditions under which compaction is triggered. The storage engine 122, for example, may perform compaction periodically (e.g., every 15 minutes), once a level "fills up" (e.g., when the level contains more than a certain number of storage objects, the level exceeds a particular size, or the ratio of size or number of storage objects between two adjacent levels exceeds a particular value).

Where the database management system supports the use of database transactions, the storage engine 122 may be responsible for ensuring the atomicity and isolation of the transaction. The changes to the database made by a transaction, for example, may initially be placed in an uncommitted state by the storage engine 122, such that the changes are not visible to other transactions. If the transaction is successful, the storage engine 122 may commit the changes, making them persistent and visible to other transactions. If the transaction fails (i.e., if the transaction is aborted), the database changes may remain in the uncommitted state, and are eventually purged from the system (e.g., as part of a garbage collection operation). In some embodiments, for example, the storage engine 122 may assign a sequence number to database changes to commit them to the database; changes made to the database during the course of a transaction may only be assigned a sequence number if the transaction is successful.

In order to avoid issues that can arise when supporting database transactions for LSM tree databases (e.g., when a flush operation is initiated with uncommitted data of an ongoing transaction in Level 0), the storage engine 122 may employ a hold-aside buffer, which may reside in memory (e.g., volatile memory 132). When a flush operation is triggered, the storage engine 122 may move uncommitted data from any ongoing transactions in Level 0 to the hold-aside buffer. The uncommitted data may remain in the hold-aside buffer until the respective transactions commits, at which point the data can be committed (e.g., by assigning a sequence number). After the uncommitted data is moved to the hold-aside buffer, the storage engine 122 can proceed with the flush operation and merge the committed data remaining in Level 0 with any committed data in the hold-aside buffer (i.e., data from previously ongoing transactions that committed since the last flush operation). The merge results can then be written to Level 1 as a new storage object.

The application client 111, storage application 121, storage engine 122, and memory and storage devices 131 may operate on, or be provided by, one or more servers and/or server clusters. For example, as illustrated in FIG. 1, the application client 111 may be provided by one or more application server(s) 110 that can communicate with one or more database server(s) 120 via network 140. The database server(s) 120 may host the storage application 121 and storage engine 122, which can operate to maintain one or more databases for use by the application client 111, as discussed above. The storage engine 121 may maintain the databases on one or more memory and storage devices 131. As illustrated in FIG. 1, the memory and storage devices 131 may be provided as direct-attached storage (DAS) to the database server(s) 121. In some embodiments, the memory and storage devices 131 may additionally (or alternatively) be provided as remote storage (e.g., by network attached storage (NAS) or a storage area network (SAN)) that database server(s) 120 may access via network 140.

Figure 2:
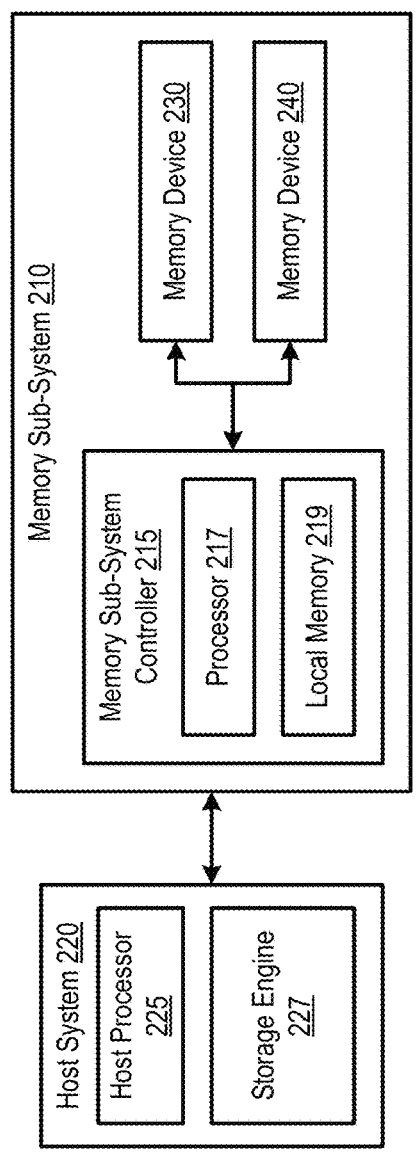
FIG. 2 illustrates an exemplary computing system in accordance with some embodiments of the present disclosure.

FIG. 2 illustrates an exemplary computing system 200 in accordance with some embodiments of the present disclosure. The computing system 200 can be a computing device such as a desktop computer, laptop computer, network server, mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such computing device that includes memory and a processing device.

The computing system 200 can include a host system 220 and one or more memory sub-systems 210 (for simplicity, FIG. 2 illustrates one memory sub-system 210). The memory sub-systems 210 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, a hard disk drive (HDD), an optical disk drive, or a magnetic tape drive. Examples of memory modules include a dual in-line memory module (DIMM), a small outline DIMM (SO-DIMM), and various types of non-volatile dual in-line memory modules (NVDIMMs).

The host system 220 can include a processing device that includes one or more processors (e.g., host processor 225). Each processor can include one or more cores, one or more caches, and one or more memory controllers (e.g., NVDIMM controller). The host system 220 can also include a storage controller (e.g., PCIe controller, SATA controller) and/or a network controller (e.g., an Ethernet controller) for communication over a data network, which may be provided as part of a processor chipset and/or as discrete components. The processing device of the host system 220 can be configured to execute instructions, which may be stored in a local memory or in a memory sub-system 210, for performing various processes, operations, logic flows, and routines that control operation of the host system 220. The host system 220, for example, can be configured to execute instructions to provide an application client (e.g., similar to the application client 111 of FIG. 1), a storage application (e.g., similar to the storage application 121 of FIG. 1), and/or a storage engine 227 (e.g., similar to the storage engine 122 of FIG. 1), described in further detail below.

The host system 220 can be coupled to one or more memory sub-systems 210. In some embodiments, the host system 220 is coupled to multiple memory sub-systems 210 of different types. FIG. 1 illustrates one example of a host system 220 coupled to one memory sub-system 210. The host system 220 can use the memory sub-systems 210 to read data from and write data to media of the memory sub-system 210 (e.g., memory devices 230, 240). As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 220, for example, can be coupled to the memory sub-system 210 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 220 and the memory sub-system 210. The host system 220 can further utilize an NVM Express (NVMe) interface to access components (e.g., memory devices 230) when the memory sub-system 210 is coupled with the host system 220 by the physical host interface (e.g., PCIe bus). The physical host interface can provide an interface for passing control, address, data, and other signals between the memory sub-system 210 and the host system 220.

The host system 220 can also be coupled to the memory sub-system 210 via a network host interface. The memory sub-system 210, for example, can be provided as part of a storage area network (SAN), network attached storage (NAS), or other remote storage platform, which the host system 220 can interface with over a network interface. The host system 220, for example, can utilize an Internet Small Computer Systems Interface (iSCSI) or various NVMe over Fabrics (NVMe-oF) (e.g., NVMe over Fiber, NVMe over Ethernet, NVMe over Infiniband, NVMe over TCP) to access the memory sub-system 210 and its components (e.g., memory devices 230, 240). The network host interface can provide an interface for passing control, address, data, and other signals between the memory sub-system 210 and the host system 220.

In general, the host system 220 can access multiple memory sub-systems via a same communication connection, multiple separate communication connections, and/or a combination of communication connections.

As noted above, the memory sub-system 210 can include media, such as one or more volatile memory devices (e.g., memory device 240), one or more non-volatile memory devices (e.g., memory device 230), or a combination thereof. The memory devices 230, 240 can include any combination of the different types of non-volatile memory devices and/or volatile memory devices. The volatile memory devices (e.g., memory device 240) can be, but are not limited to, random access memory (RAM), such as dynamic random access memory (DRAM) and synchronous dynamic random access memory (SDRAM).

Some examples of non-volatile memory devices (e.g., memory device 230) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 230 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 230 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 230 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 230 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM). The memory device 230 can also be based on mechanically addressed forms of media, such as magnetic tape, magnetic disks, or optical discs.

The memory sub-system 210 can include a memory sub-system controller 215 (or controller 215 for simplicity) that can communicate with the memory devices 230, 240 to perform operations such as reading data, writing data, or erasing data at the memory devices 230, 240, and other such operations. The memory sub-system controller 215 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 215 can be a microcontroller, special purpose logic circuitry (e.g., a field programmable gate array (FPGA), an application specific integrated circuit (ASIC), etc.), or other suitable processor.

The memory sub-system controller 215 can include a processing device, which includes one or more processors (e.g., processor 217), configured to execute instructions stored in a local memory 219. In the illustrated example, the local memory 219 of the memory sub-system controller 215 includes an embedded memory configured to store instructions for performing various processes, operations, logic flows, and routines that control operation of the memory sub-system 210, including handling communications between the memory sub-system 210 and the host system 220.

In some embodiments, the local memory 219 can include memory registers storing memory pointers, fetched data, etc. The local memory 219 can also include read-only memory (ROM) for storing micro-code. While the example memory sub-system 210 in FIG. 2 has been illustrated as including the memory sub-system controller 215, in another embodiment of the present disclosure, a memory sub-system 210 does not include a memory sub-system controller 215, and can instead rely upon external control (e.g., provided by an external host, or by a processor or controller separate from the memory sub-system).

In general, the memory sub-system controller 215 can receive commands or operations from the host system 220 and can convert the commands or operations into instructions or appropriate commands to achieve the desired access to the memory devices 230, 240. The memory sub-system controller 215 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 230, 240. The memory sub-system controller 215 can further include host interface circuitry to communicate with the host system 220 (e.g., via a physical host interface or network host interface). The host interface circuitry can convert the commands received from the host system 220 into command instructions to access the memory devices 230, 240 as well as convert responses associated with the memory devices 230, 240 into information for the host system 220.

The memory sub-system 210 can also include additional circuitry or components that are not illustrated. In some embodiments, the memory sub-system 210 can include a cache or buffer (e.g., DRAM) and address circuitry (e.g., a row decoder and a column decoder) that can receive an address from the memory sub-system controller 215 and decode the address to access the memory devices 230, 240.

As mentioned above, the host system 220 can be configured to execute instructions to provide a storage engine 227 that may read data from, and writing data to, one or more memory sub-systems 210. The storage engine 227, for example, may maintain an LSM tree database, with its data residing in a hierarchy of storage levels (i.e., Levels 0 to N) stored on one or more memory sub-systems 210. In order to avoid issues that can arise when supporting database transactions for LSM tree databases (e.g., when a flush operation is initiated with uncommitted data for an ongoing transaction in Level 0), the storage engine 227 may employ a hold-aside buffer. During a flush operation, uncommitted data from any ongoing transactions in Level 0 can be moved to the hold-aside buffer, allowing the remaining committed data to be written to Level 1. The uncommitted data may remain in the hold-aside buffer until its transaction commits, at which point the data can be committed and safely flushed to Level 1. Further details regarding the storage engine 227 and its operation are provided below.

The storage engine 227 may interface with one or more memory sub-systems 210 to provide storage functionality for a storage application. The storage engine 227, for example, may serve as an interface for reading data from, and writing data to, a database (i.e., the storage application). The storage engine 122, for example, may be configured to maintain a database as an LSM tree (i.e., an LSM tree database), with its data residing in a hierarchy of storage levels (i.e., Levels 0 to N) written across one or more memory sub-systems 210. Level 0, for example, may be stored in one or more volatile memory devices (e.g., memory device 240), whereas Levels 1 to N may be stored in one or more non-volatile memory devices (e.g., memory devices 230).

The storage engine 227 may support two elemental data operations for LSM tree database: store (or put) and read (or get). The store operation may be used to add data (i.e., in the form of a key-value pair) to the database, and the read operation may be used to retrieve data from the database. The storage engine 227 may support additional database operations, such as an update or delete operation, which the storage engine 227 may recast for LSM tree databases (i.e., as a store operation). The storage engine 122, for example, may perform an update by adding a key-value pair to the database with the new value to be associated with the key. Likewise, for a delete operation, the storage engine 122 may add a key-value pair with a special value indicating deletion for the key.

The storage engine 227 may store incoming data (e.g., from a store, update, or delete database operation) as a key-value pair in Level 0. Where the incoming data is part of a database transaction, the storage engine 227 may associate the key-value pair with a transaction identifier that uniquely identifies the transaction that originated the key-value pair and a transaction status that indicates whether the transaction is active, committed, or aborted. The storage engine 227 may also assign a sequence number to the key-value pairs that may provide a relative age of the key-value pair. For non-transaction key-value pairs (i.e., that are not associated with a transaction), the sequence number may be assigned when the key-value pair is stored in Level 0. For key-value pairs associated with a transaction, the sequence number may be assigned when the transaction commits.

In some embodiments, the storage engine 227 may maintain data within Level 0 in one or more data structures (e.g., as multisets). Level 0, for example, may include a number of key-value multisets, where each key-value multiset consists of a collection of key-value pairs. The storage engine 227 may maintain one active multiset in which incoming key-value pairs are stored. Once the active multiset "fills up" (e.g., when the multiset reaches a particular size or age), the storage engine 227 may freeze the multiset and create a new, active multiset. The storage engine 227 may assign a data generation number to the multisets that may provide a relative age of the multiset which can be used to maintain an order of the multisets (e.g., newest to oldest). The initial active multiset of the database, for example, may be assigned a data generation number of 1, which may be incremented and assigned to each subsequent active multiset. The data generation number may persist across the lifetime of the database such that the data generation numbers may be uniquely associated with the data that originated in a particular multiset.

The storage engine 227 may be configured to "flush" (or "ingest") data from Level 0 to Level 1, whereby data in Level 0 is written to Level 1 as an immutable "storage object" (i.e., that cannot be modified). The storage engine 227 may flush data when certain flush event triggers are encountered. The storage engine 227, for example, may be configured to flush data in Level 0 periodically (e.g., every 50 ms), upon request from the associated storage application, and/or once Level 0 "fills up" (e.g., exceeds a particular size), with each flush operation resulting in the creation of a new storage object (e.g., a key-value set).

When a flush operation is triggered, the storage engine 227 may first determine whether any uncommitted data from an active transaction is present in Level 0. If uncommitted data from an active transaction is present, the storage engine 227 may move the uncommitted data to a hold-aside buffer. The hold-aside buffer may reside in volatile memory (e.g., memory device 240). In some embodiments, the hold-aside buffer may be structured as a read-copy-update bonsai tree, with its underlying memory being dynamically allocated by the storage engine 227 and/or memory sub-system 210.

The uncommitted data may remain in the hold-aside buffer until the transactions associated with the data commit (i.e., if the transactions are successful). Once the transactions commit, the storage engine 227 may commit the data (e.g., by assigning it a sequence number). Once the uncommitted data has been moved to the hold-aside buffer, the storage engine 227 may "merge" the committed data remaining in Level 0 with any committed data in the hold-aside buffer (e.g., from transactions that had committed since the last flush operation). The merge operation, for example, may return the union of committed key-value pairs in Level 0 and the hold-aside buffer sorted by key, which the storage engine 227 can then store in Level 1 (e.g., as a key-value set).

In embodiments where data in Level 0 is maintained in separate key-value multisets (or other separate data structures), the storage engine 227 may be configured to flush one or more key-value multisets when the flush event trigger is encountered. The storage engine 227, for example, may configure the flush event to process a single key-value multiset, or may configure the flush event to process multiple key-value multisets. The storage engine 227 may execute one flush event to completion before starting the next flush operation, or may allow new flush events to start before earlier flush events have completed. In the latter case, the storage engine 227 may also operate to ensure that the resulting storage objects are "saved" to Level 1 in the same order as the associated flush events were started.

The storage engine 227 may follow a similar process for flushing a key-value multiset as that described above. The storage engine 227, for example, may determine whether any uncommitted data from an active transaction is present in the key-value multiset. If so, the storage engine 227 may move the uncommitted data to the hold-aside buffer, where it may remain until the transaction associated with the data commits. Once the uncommitted data has been moved to the hold-aside buffer, the storage engine 227 may merge the committed data remaining in the key-value multiset with any committed data in the hold-aside buffer, which can then be stored in Level 1 (e.g., as a key-value set).

In some embodiments, the storage engine 227 may also operate to ensure that all changes for a transaction are persisted together. For example, in some cases, the changes made by a transaction may be stored across multiple key-value multisets. Even if the entire transaction has been committed, if only some of the key-value multisets are flushed to Level 1, the atomicity of the transaction could be broken. The storage engine 227, therefore, may confirm that all changes for a particular transaction are present either in the key-value multiset being flushed or in the hold-aside buffer before the changes are flushed to Level 1. If not all changes are present, the storage engine 227 may move any committed data in the key-value multiset for the transaction into the hold-aside buffer so that it may be flushed with the remaining transaction data as part of a later flush operation.

The storage engine 227 may also be configured to perform a garbage collection operation on the hold-aside buffer to remove data that is no longer needed. The garbage collection operation may be performed periodically and/or in conjunction with a flush operation. The storage engine 227, for example, may remove committed data once it has been written to Level 1 along with any data associated with aborted transactions. In some embodiments, the storage engine 227 may also confirm that the committed data is no longer visible to any existing or future read operations before it can be removed from the hold-aside buffer.

As noted above, the storage engine 227 may support a read (or get) operation that can be used to retrieve data from the database. The storage engine 227, for example, may respond to a read request by searching the LSM tree and returning the value (or set of values) associated with a particular key (or a "not found" status, where no such key exists). In some embodiments, the read operation may return the value of the most recently added key-value pair. In some embodiments, the storage engine 227 may uphold the invariant that data in higher levels of the LSM tree be older than data in lower levels of the LSM tree (e.g., data in Level 0 is newer than data in Levels 1 to N). In such cases, the search may proceed from top to bottom (i.e., Level 0 to Level N, and from newest to oldest within each level) and terminate as soon as a key-value pair is found, as this would be the most recent key-value pair added to the database.

The use of the hold-aside buffer may affect how the storage engine 227 handles read requests. For example, in responding to a read request, the storage engine 227 might also search the hold-aside buffer for matching key-value pairs. If the read request originated from a transaction, the storage engine 227 may return any committed key-value pairs in the hold-aside buffer as well as any uncommitted key-value pairs in the hold-aside buffer that are part of the same transaction. If the read request is not associated with a transaction, or is a single-operation transaction (or modelled as such), the storage engine 227 may only return those key-value pairs in the hold-aside buffer that have been committed.

The storage engine 227 may also be configured to perform a "compaction" operation, whereby storage objects in levels 1 and higher of the LSM tree (i.e., Levels 1 to N) may be "merged" together to form new storage objects. The merge operation may return the union of key-value pairs sorted by key, and may eliminate duplicate and deleted data (i.e., perform garbage collection). The new storage objects may be placed in the same or the next higher numbered storage level, after which the original storage objects are deleted. The storage engine 227 may employ different compaction policies, for example, to constrain the shape of the LSM tree, to determine what storage objects are to be merged, and/or to define the conditions under which compaction is triggered. The storage engine 122, for example, may perform compaction periodically (e.g., every 15 minutes) or once a level "fills up" (e.g., when the level contains more than a certain number of storage objects, the level exceeds a particular size, or the ratio of size or number of storage objects between two adjacent levels exceeds a particular value).

Figure 3:
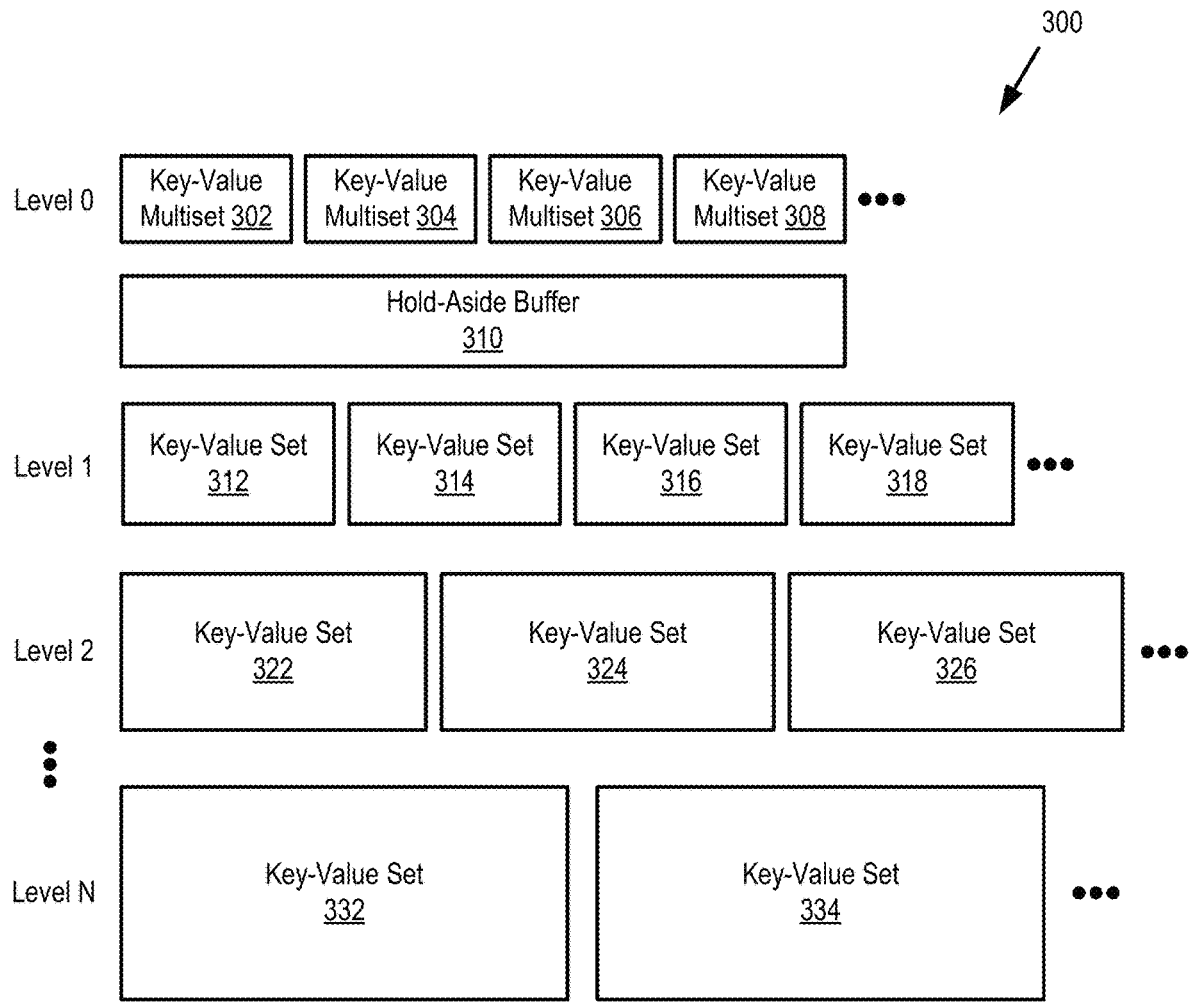
FIG. 3 illustrates an exemplary storage hierarchy for storing information in an LSM tree database in accordance with some embodiments of the present disclosure.

FIG. 3 illustrates an exemplary storage hierarchy 300 that may be implemented by a storage engine for storing an LSM tree database. The storage hierarchy 300 may include a number of storage levels (i.e., Level 0 to Level N) that may be written across one or more underlying data storage devices. Level 0, for example, may be stored in one or more volatile memory devices, whereas Levels 1 to N may be stored in one or more non-volatile memory devices.

The storage engine may maintain data within Level 0 as one or more key-value multisets 302-308. The storage engine may contain one active key-value multiset (e.g., key-value multiset 302) and zero or more frozen key-value multisets (e.g., key-value multisets 304-308). The storage engine may store incoming data (e.g., from a store, update, or delete database operation) in the active key-value multiset. Once the active key-value multiset "fills up," the storage engine may freeze the key-value multiset and create a new, active key-value multiset. The storage engine may maintain an order for the key-value multisets (e.g., by assigning the key-value multisets unique data generation number), from newest (e.g., key-value multiset 302) to oldest (e.g., key-value multiset 308), such that a temporally ordered search of Level 0 may proceed in serial fashion through each of the key-value multisets 304-308.

The storage engine may perform a "flush" (or "ingest") operation to migrate data from Level 0 to Level 1, where it is stored as a key-value set (e.g., key-value sets 312-318). Each flush operation performed by the storage engine may result in the creation of a new key-value set (e.g., key-value sets 312-318). As discussed above, the storage engine may utilize a hold-aside buffer 310 to facilitate the flush operation. The storage engine, for example, may move any uncommitted data from an active transaction that is present in the key-value multiset being flushed to the hold-aside buffer 310, where it may remain until the transaction associated with the data commits. Once the uncommitted data has been moved to the hold-aside buffer 310, the storage engine may merge the committed data remaining in the key-value multiset with any committed data in the hold-aside buffer 310, which can then be stored in Level 1 as a sorted key-value set (e.g., key-value sets 312-318). The storage engine may maintain an order for the key-value sets, from newest (e.g., key-value set 312) to oldest (e.g., key-value set 318), such that a temporally ordered search of Level 1 may proceed in serial fashion through each of the key-value sets 312-318.

The storage engine may also perform a "compaction" operation, whereby key-value sets in higher levels of the LSM tree (i.e., Levels 1 to N) can be "merged" together to form new key-value sets. The merge operation may return the union of key-value pairs sorted by key, and may eliminate duplicate and deleted data (i.e., perform garbage collection). The new key-value sets may be placed in the same or the next higher numbered storage level, after which the original key-value sets are deleted. For example, key-value sets 322-326 in Level 2 could have been created by a compaction operation that merged two Level 1 key-value sets. Similarly, key-value sets 332-334 in Level N could have been created by a compaction operation that merged two Level N−1 key-value sets. As with Level 0 and Level 1, the storage engine may maintain an order for the key-value sets in each of Levels 2 to N, from newest (e.g., key-value set 322, key-value set 332) to oldest (e.g., key-value set 326, key-value set 334), such that a temporally ordered search of a particular level may proceed in serial fashion through each key-value set therein.

Figure 4:
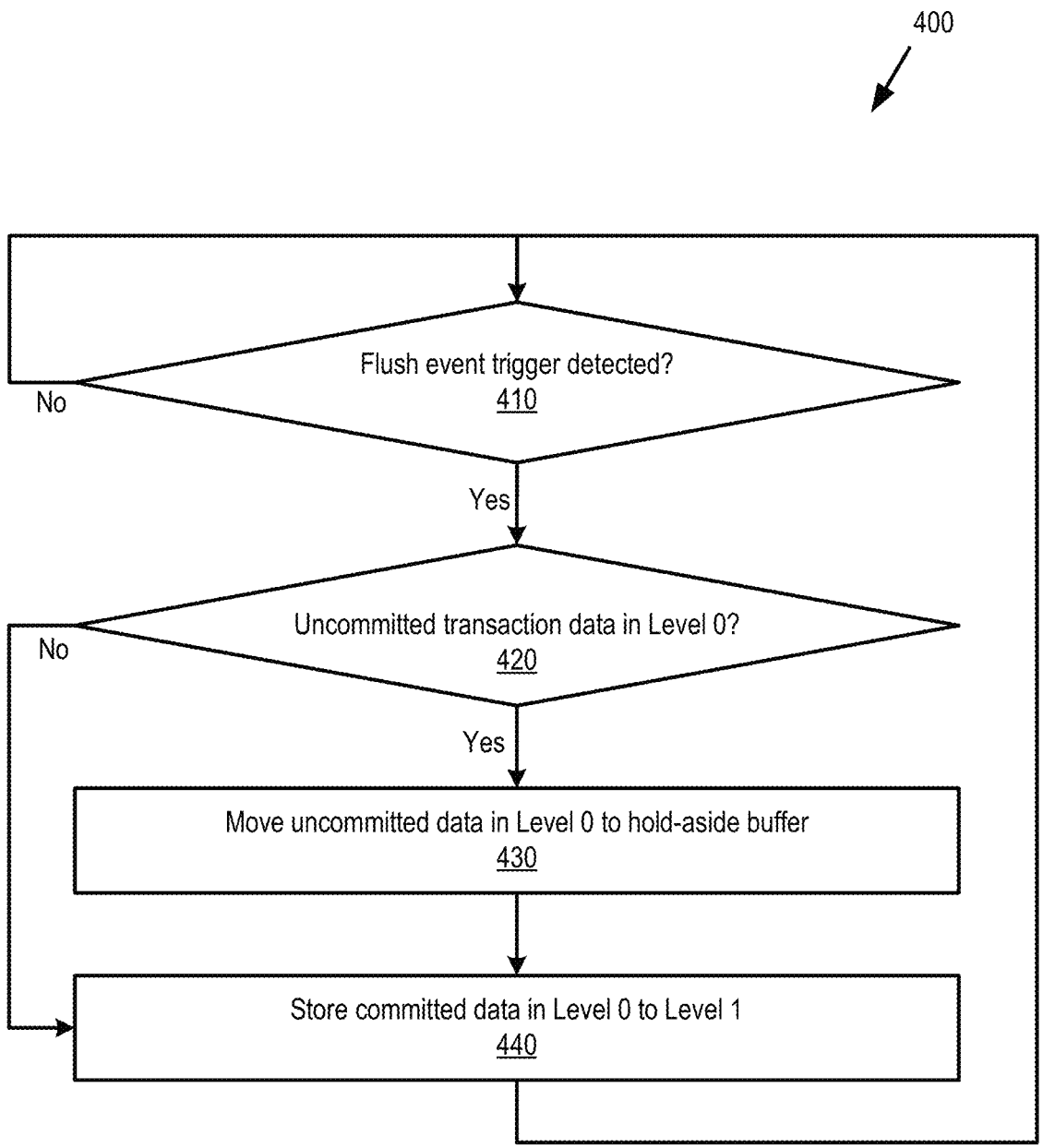
FIG. 4 is a flow diagram of an exemplary method for maintaining an LSM tree database in accordance with some embodiments of the present disclosure.

FIG. 4 is a flow diagram of an exemplary method for maintaining an LSM tree database in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the storage engine 227 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic may detect a flush event trigger for initiating performance of a "flush" operation on the LSM tree database. As previously discussed, the LSM tree database may be organized in a hierarchy of storage levels (i.e., Levels 0 to N) residing on one or more memory and/or storage devices. Level 0, for example, may be stored in volatile memory, whereas Levels 1 to N may be stored on one or more storage devices. Incoming data (e.g., from a store, update, or delete database operation) may be stored as a key-value pair in Level 0. Where the incoming data is part of a database transaction, the key-value pair may be associated with a transaction identifier that uniquely identifies the transaction that originated the key-value pair and a transaction status that indicates whether the transaction is active, committed, or aborted. Key-value pairs may also be assigned a sequence number that may provide a relative age of the key-value pair. For non-transaction key-value pairs (i.e., that are not associated with a transaction), the sequence number may be assigned when the key-value pair is stored in Level 0. For key-value pairs associated with a transaction, the sequence number may be assigned when the transaction commits.

In some embodiments, data within Level 0 may be maintained in one or more data structures (e.g., as multisets). Level 0, for example, may include a number of key-value multisets (e.g., key-value multiset 302-308), where each key-value multiset consists of a collection of key-value pairs. Incoming data (e.g., from a store, update, or delete database operation) may be stored in an active key-value multiset (e.g., key-value multiset 302). Where the incoming data is part of a database transaction, the data may be associated with a transaction identifier and a transaction status, which may initially be set to "active". Once the active multiset "fills up" (e.g., when the multiset reaches a particular size or age), it may be frozen (e.g., key-value multisets 304-308) and a new, active multiset may be created. In a flush operation, data is migrated from Level 0 to Level 1 of the LSM tree database. In embodiments where data in Level 0 is maintained in separate key-value multisets (or other separate data structures), the flush operation may cover one or more key-value multisets (e.g., key-value multisets 304-308). The flush event trigger, for example, may flush the oldest key-value multiset, the N oldest key-value multisets, or all frozen key-value multisets. The key-value multisets may be processed separately, in serial fashion from oldest to newest, or may first be merged and processed collectively. A flush event trigger (i.e., to initiate the flush operation) may be triggered periodically (e.g., every 50 ms), upon request from an associated storage application, and/or once Level 0 "fills up" (e.g., exceeds a particular size).

At operation 420, in response to detecting a flush event trigger, the processing logic may determine whether any uncommitted data from an active transaction is present in Level 0. The processing logic, for example, may examine each key-value pair in Level 0 and identify those key-value pairs having an active transaction status. In embodiments where data in Level 0 is maintained in separate key-value multisets (or other separate data structures), the processing logic may first select the key-value multisets to be flushed, and then examine each key-value pair in the key-value multiset(s) being flushed and identify those key-value pairs having an active transaction status.

At operation 430, in response to a determination that uncommitted data for one or more active database transactions is present in Level 0 (or the key-value multiset(s) being flushed therein), the processing logic may move the uncommitted data to a hold-aside buffer, allowing the remaining committed data to be written to Level 1. The uncommitted data may remain in the hold-aside buffer until the transaction associated with the data commits, at which point the transaction data may be committed (e.g., by assigning it a sequence number and updating its transaction status).

At operation 440, the processing logic may store the remaining committed data in Level 0 (or the key-value multiset(s) being flushed therein) in Level 1 (i.e., as a storage object). In some embodiments, the processing logic may also determine whether any committed data is present in the hold-aside buffer (e.g., from transactions that committed since the last flush operation). In some embodiments, the processing logic may first merge the committed data in Level 0 (or the key-value multiset(s) being flushed therein) with the committed data in the hold-aside buffer, and flush the merged result to Level 1.

In some embodiments, the processing logic may also operate to ensure that all changes for a transaction are persisted together. For example, in some cases, the changes made by a transaction may be stored across multiple key-value multisets. Even if the entire transaction has been committed, if only some of the key-value multisets are ingested to Level 1, the atomicity of the transaction could be broken. The processing logic, therefore, may determine whether all changes for a particular transaction are present either in the key-value multiset(s) being processed or in the hold-aside buffer. If not all changes are present, the processing logic may move any committed data in the key-value multiset to the hold-aside buffer so that it may be ingested with the remaining transaction data as part of a later flush operation.

The processing logic may also operate to perform garbage collection on the hold-aside buffer to remove data that is no longer needed. The garbage collection operation may be performed periodically and/or in conjunction with a flush operation. The processing logic, for example, may remove committed data once it has been written to Level 1 along with any data associated with aborted transactions. In some embodiments, the processing logic may also confirm that the committed data is no longer visible to any existing or future read operations before it can be removed from the hold-aside buffer.

Figure 5:
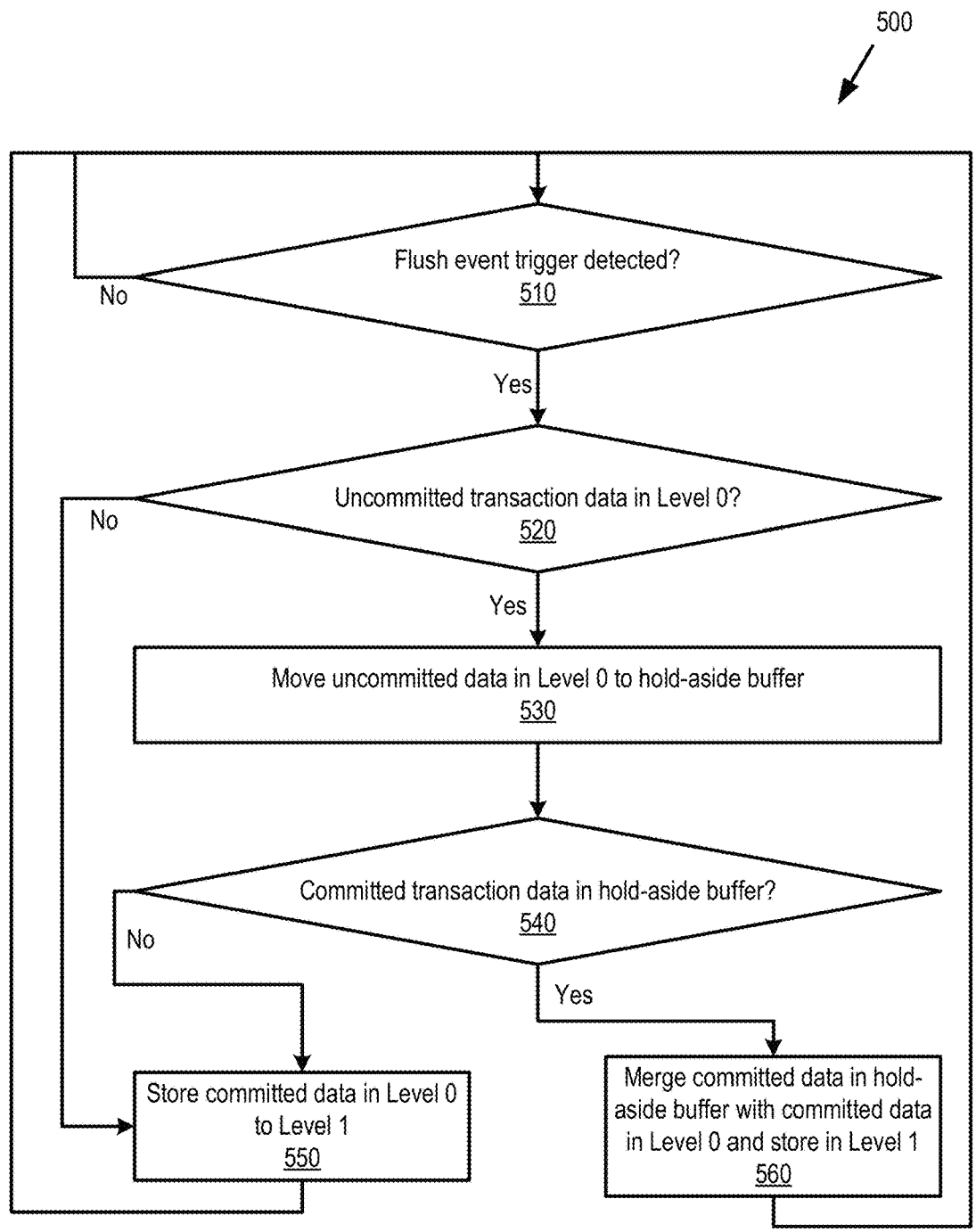
FIG. 5 is a flow diagram of an exemplary method for maintaining an LSM tree database in accordance with some embodiments of the present disclosure.

FIG. 5 is a flow diagram of an exemplary method for maintaining an LSM tree database in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the storage engine 227 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic may detect a flush event trigger for initiating performance of a "flush" operation on the LSM tree database. As previously discussed, the LSM tree database may be organized in a hierarchy of storage levels (i.e., Levels 0 to N) residing on one or more memory and/or storage devices. Level 0, for example, may be stored in volatile memory, whereas Levels 1 to N may be stored on one or more storage devices. Incoming data (e.g., from a store, update, or delete database operation) may be stored as a key-value pair in Level 0. Where the incoming data is part of a database transaction, the key-value pair may be associated with a transaction identifier that uniquely identifies the transaction that originated the key-value pair and a transaction status that indicates whether the transaction is active, committed, or aborted. Key-value pairs may also be assigned a sequence number that may provide a relative age of the key-value pair. For non-transaction key-value pairs (i.e., that are not associated with a transaction), the sequence number may be assigned when the key-value pair is stored in Level 0. For key-value pairs associated with a transaction, the sequence number may be assigned when the transaction commits.

In some embodiments, data within Level 0 may be maintained in one or more data structures (e.g., as multisets). Level 0, for example, may include a number of key-value multisets (e.g., key-value multiset 302-308), where each key-value multiset consists of a collection of key-value pairs. Incoming data (e.g., from a store, update, or delete database operation) may be stored in an active key-value multiset (e.g., key-value multiset 302). Where the incoming data is part of a database transaction, the data may be associated with a transaction identifier and a transaction status, which may initially be set to "active". Once the active multiset "fills up" (e.g., when the multiset reaches a particular size or age), it may be frozen (e.g., key-value multisets 304-308) and a new, active multiset may be created. In a flush operation, data is migrated from Level 0 to Level 1 of the LSM tree database. In embodiments where data in Level 0 is maintained in separate key-value multisets (or other separate data structures), the flush operation may cover one or more key-value multisets (e.g., key-value multisets 304-308). The flush event trigger, for example, may flush the oldest key-value multiset the N oldest key-value multisets, or all frozen key-value multisets. The key-value multisets may be processed separately, in serial fashion from oldest to newest, or may first be merged and processed collectively. A flush event trigger (i.e., to initiate the flush operation) may be triggered periodically (e.g., every 50 ms), upon request from an associated storage application, and/or once Level 0 "fills up" (e.g., exceeds a particular size).

At operation 520, in response to detecting a flush event trigger, the processing logic may determine whether any uncommitted data from an active transaction is present in Level 0. The processing logic, for example, may examine each key-value pair in Level 0 and identify those key-value pairs having an active transaction status. In embodiments where data in Level 0 is maintained in separate key-value multisets (or other separate data structures), the processing logic may first select the key-value multisets to be flushed, and then examine each key-value pair in the key-value multiset(s) being flushed and identify those key-value pairs having an active transaction status.

At operation 530, in response to a determination that uncommitted data for one or more active database transactions is present in Level 0 (or the key-value multiset(s) being flushed therein), the processing logic may move the uncommitted data to a hold-aside buffer, allowing the remaining committed data to be written to Level 1. The uncommitted data may remain in the hold-aside buffer until the transaction associated with the data commits, at which point the transaction data may be committed (e.g., by assigning it a sequence number and updating its transaction status).

At operation 540, the processing logic may determine whether any committed data is present in the hold-aside buffer (e.g., from transactions that committed since the last flush operation).

At operation 550, in response to a determination that no committed data is present in the hold-aside buffer, the processing logic may store the remaining committed data in Level 0 (or the key-value multiset(s) being flushed therein) in Level 1 (i.e., as a storage object).

At operation 560, in response to a determination that committed data is present in the hold-aside buffer, the processing logic may merge the committed data in Level 0 (or the key-value multiset(s) being flushed therein) with the committed data in the hold-aside buffer, and store the merged result to Level 1 (i.e., as a storage object).

In some embodiments, the processing logic may also operate to ensure that all changes for a transaction are persisted together. For example, in some cases, the changes made by a transaction may be stored across multiple key-value multisets. Even if the entire transaction has been committed, if only some of the key-value multisets are ingested to Level 1, the atomicity of the transaction could be broken. The processing logic, therefore, may determine whether all changes for a particular transaction are present either in the key-value multiset(s) being processed or in the hold-aside buffer. If not all changes are present, the processing logic may move any committed data in the key-value multiset to the hold-aside buffer so that it may be ingested with the remaining transaction data as part of a later flush operation.

The processing logic may also operate to perform garbage collection on the hold-aside buffer to remove data that is no longer needed. The garbage collection operation may be performed periodically and/or in conjunction with a flush operation. The processing logic, for example, may remove committed data once it has been written to Level 1 along with any data associated with aborted transactions. In some embodiments, the processing logic may also confirm that the committed data is no longer visible to any existing or future read operations before it can be removed from the hold-aside buffer.

Figure 6:
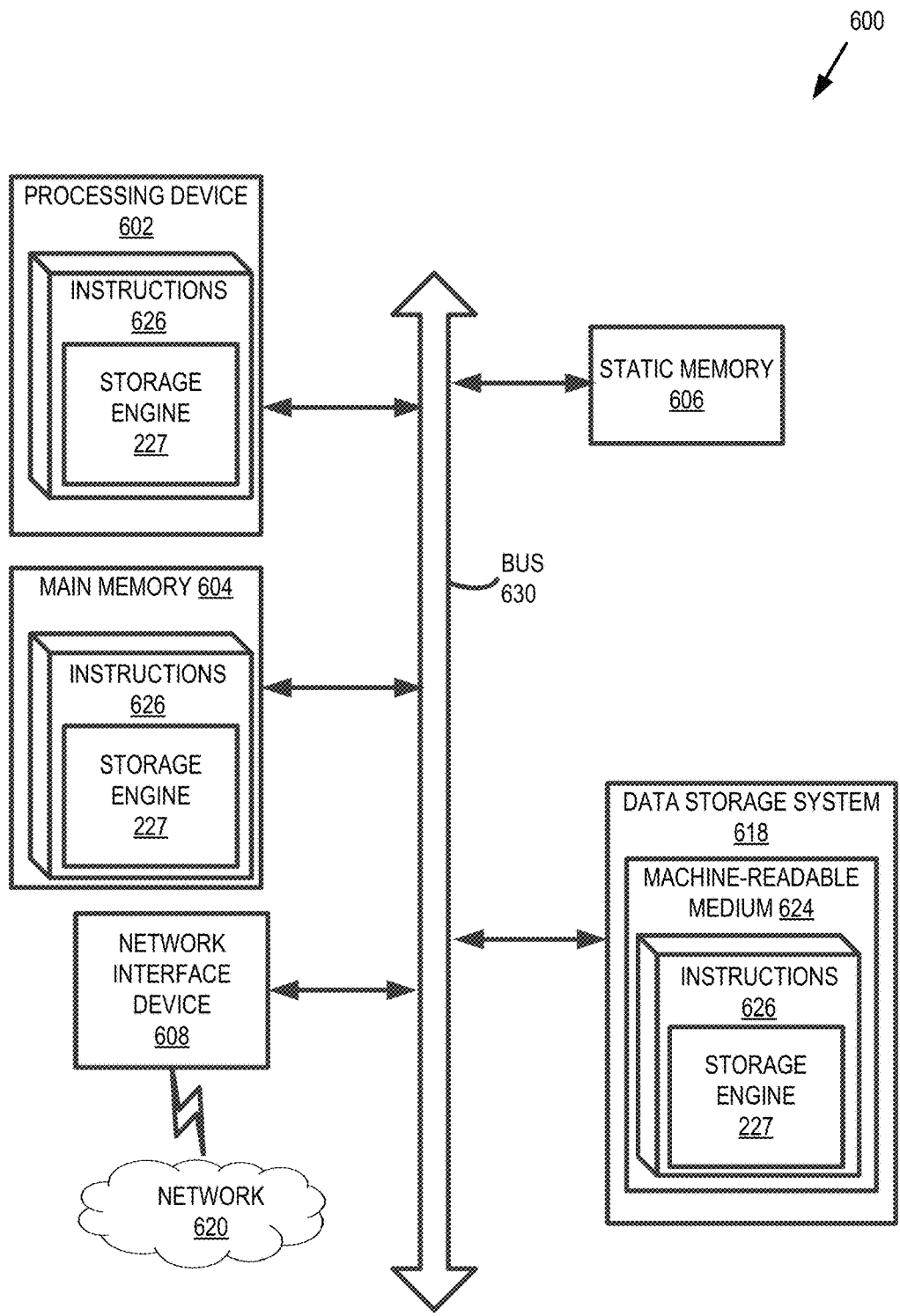
FIG. 6 is a block diagram of an exemplary computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 220 of FIG. 2) that includes, is coupled to, or utilizes a memory sub-system (e.g., the memory sub-system 210 of FIG. 2) or can be used to perform the operations of a controller (e.g., to execute an operating system to perform operations corresponding to the storage engine 227 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 210 of FIG. 2.

In one embodiment, the instructions 626 include instructions to implement functionality corresponding to a storage engine (e.g., the storage engine 227 of FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a volatile memory device;
a non-volatile memory device; and
a processing device, operatively coupled with the volatile memory device and non-volatile memory device, configured to perform operations comprising:
executing a series of database transactions;
determining that at least one database transaction of the series of database transactions has committed; and
moving first key-value data associated with the at least one database transaction from a hold-aside buffer in the volatile memory device to the non-volatile memory device, wherein second key-value data associated with at least one other uncommitted database transaction remains in the hold-aside buffer.

2. The system of claim 1, wherein key-value data is maintained in a log-structured merge (LSM) tree comprising a plurality of hierarchical storage levels across the volatile memory device and the non-volatile memory device.

3. The system of claim 2, wherein the processing device is configured to perform operations further comprising:
merging the first key-value data with third key-value data associated with at least one other committed database transaction and stored in a first storage level of the LSM tree on the volatile memory device; and
storing the first key-value data and the third key-value data in a second storage level of the LSM tree on the non-volatile memory device.

4. The system of claim 3, wherein the processing device is configured to perform operations further comprising:
detecting an event trigger to flush key-value data from the first storage level of the LSM tree to the second level of the LSM tree; and
moving the first key-value data and the second key-value data from the first storage level of the LSM tree to the hold-aside buffer in the volatile memory device.

5. The system of claim 4, wherein the at least one database transaction and the at least one other uncommitted database transaction are uncommitted when the event trigger is detected.

6. The system of claim 5, wherein the at least one database transaction is committed after the event trigger is detected and after the first key-value data is moved to the hold-aside buffer.

7. The system of claim 1, wherein the processing device is configured to perform operations further comprising:
executing a garbage collection operation on the hold-aside buffer moving the first key-value data to the non-volatile memory device.

8. A method comprising:
executing a series of database transactions;
determining that at least one database transaction of the series of database transactions has committed; and
moving first key-value data associated with the at least one database transaction from a hold-aside buffer in a volatile memory device to a non-volatile memory device, wherein second key-value data associated with at least one other uncommitted database transaction remains in the hold-aside buffer.

9. The method of claim 8, wherein key-value data is maintained in a log-structured merge (LSM) tree comprising a plurality of hierarchical storage levels across the volatile memory device and the non-volatile memory device.

10. The method of claim 9, further comprising:
merging the first key-value data with third key-value data associated with at least one other committed database transaction and stored in a first storage level of the LSM tree on the volatile memory device; and
storing the first key-value data and the third key-value data in a second storage level of the LSM tree on the non-volatile memory device.

11. The method of claim 10, further comprising:
detecting an event trigger to flush key-value data from the first storage level of the LSM tree to the second level of the LSM tree; and
moving the first key-value data and the second key-value data from the first storage level of the LSM tree to the hold-aside buffer in the volatile memory device.

12. The method of claim 11, wherein the at least one database transaction and the at least one other uncommitted database transaction are uncommitted when the event trigger is detected.

13. The method of claim 12, wherein the at least one database transaction is committed after the event trigger is detected and after the first key-value data is moved to the hold-aside buffer.

14. The method of claim 8, further comprising:
executing a garbage collection operation on the hold-aside buffer moving the first key-value data to the non-volatile memory device.

15. A non-transitory computer-readable storage medium storing instructions which, when executed by a processing device, cause the processing device to perform operations comprising:
executing a series of database transactions;
determining that at least one database transaction of the series of database transactions has committed; and
moving first key-value data associated with the at least one database transaction from a hold-aside buffer in a volatile memory device to a non-volatile memory device, wherein second key-value data associated with at least one other uncommitted database transaction remains in the hold-aside buffer.

16. The non-transitory computer-readable storage medium of claim 15, wherein key-value data is maintained in a log-structured merge (LSM) tree comprising a plurality of hierarchical storage levels across the volatile memory device and the non-volatile memory device.

17. The non-transitory computer-readable storage medium of claim 16, wherein the instructions cause the processing device to perform operations further comprising:
merging the first key-value data with third key-value data associated with at least one other committed database transaction and stored in a first storage level of the LSM tree on the volatile memory device; and
storing the first key-value data and the third key-value data in a second storage level of the LSM tree on the non-volatile memory device.

18. The non-transitory computer-readable storage medium of claim 17, wherein the instructions cause the processing device to perform operations further comprising:
detecting an event trigger to flush key-value data from the first storage level of the LSM tree to the second level of the LSM tree; and
moving the first key-value data and the second key-value data from the first storage level of the LSM tree to the hold-aside buffer in the volatile memory device.

19. The non-transitory computer-readable storage medium of claim 18, wherein the at least one database transaction and the at least one other uncommitted database transaction are uncommitted when the event trigger is detected.

20. The non-transitory computer-readable storage medium of claim 19, wherein the at least one database transaction is committed after the event trigger is detected and after the first key-value data is moved to the hold-aside buffer.

* * * * *